United States Patent Office 3,507,687
Patented Apr. 21, 1970

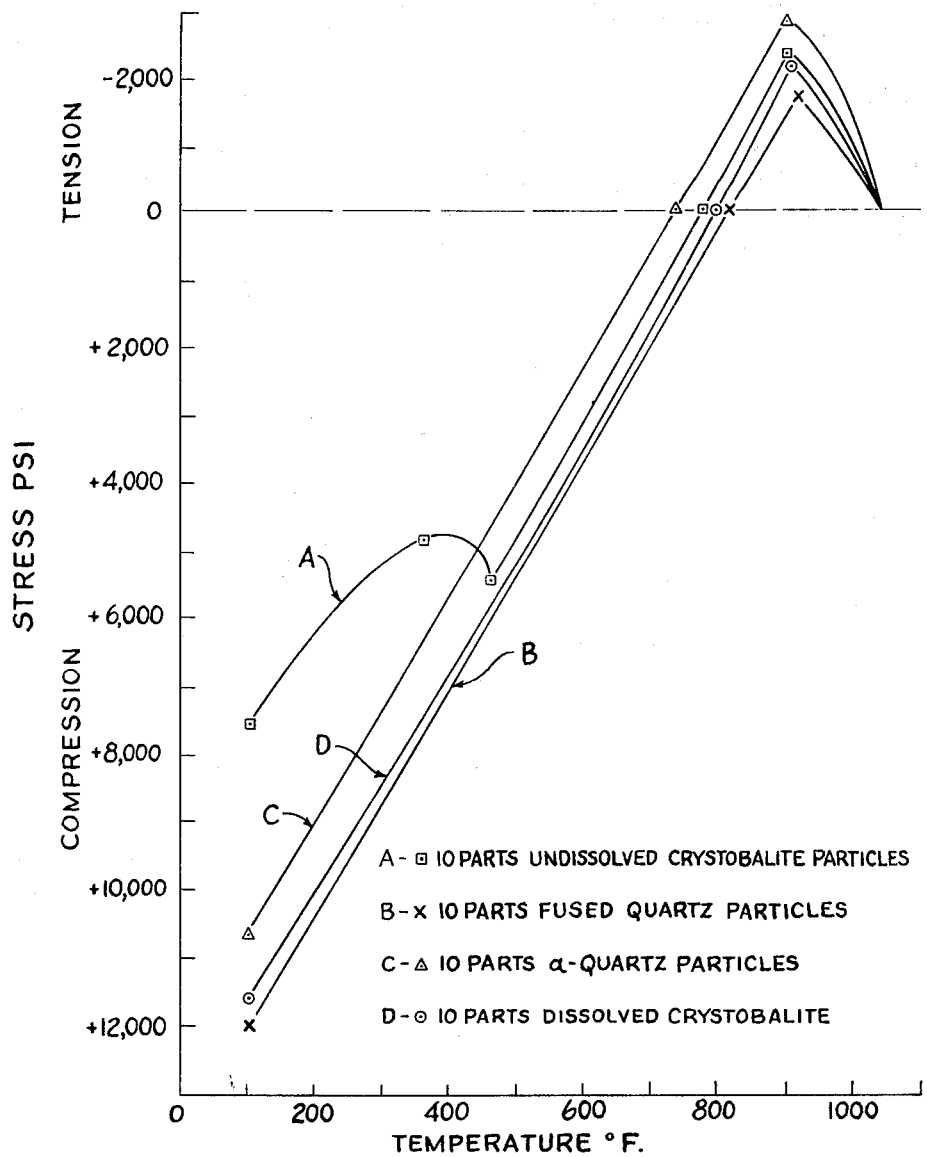
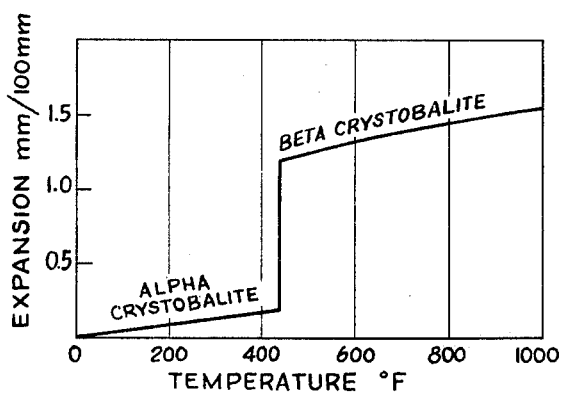
Fig. 2.
Fig. 1.
INVENTOR
JAMES A. LAIRD
BY
Andrus & Starke
ATTORNEYS

3,507,687
GLASS COATED FERROUS ARTICLE AND METHOD OF MAKING THE SAME
James A. Laird, 331 Quinlan Drive,
Pewaukee, Wis. 53072
Filed Mar. 9, 1966, Ser. No. 532,927
Int. Cl. B32b *15/00;* C23d
U.S. Cl. 117—129          9 Claims

ABSTRACT OF THE DISCLOSURE

A glass coated metal article in which the glass coating contains a plurality of undissolved particles of crystobalite. The glass coating exhibits an inversion on cooling, thereby providing the coating with improved resistance to radii spalling as well as excellent corrosion resistance.

---

This invention relates to a glass coated ferrous article and to a method of making the same.

Glass or vitreous enamel coatings are frequently applied to ferrous metals, such as steel, to prevent corrosion of the steel base. In the normal glass coating procedure, glass frit, along with a mill addition, is applied to the surface of the steel base in the form of a slip or slurry. After drying of the slip, the coated article is heated or fired at an elevated temperature, generally in the range of 1500 to 1800° F., to fuse the glass.

Steel has a higher coefficient of thermal expansion than the glass and on cooling from the firing temperature, the steel will contract or shrink at a faster rate than the glass which puts the glass under compression. A high compressive stress in the glass tends to decrease thermal shock spalling of the glass, but increases the tendency for spalling on sharp radii or edges, commonly referred to as radii spalling. Conversely, if a glass has a relatively low compressive stress, the tendency for thermal shock spalling will be increased, while radii spalling will be decreased.

Silica is the major constituent in most common glasses and when the glass coated article is exposed in service to highly corrosive media, a high silica content generally in the range of 70 to 85% is desired because the silica increases the resistance of the glass to chemical attack. While a high silica content improves the chemical resistance of the glass, the high silica content substantially increases the compressive stress in the glass making it highly susceptive to radii spalling. As an additional problem, devitrification frequently occurs in a high-silica glass, the major constituent of the devitrification being crystobalite. The art recognizes that the presence of crystobalite in glass is detrimental, giving rise to lower compressive stresses in the cooled glass and the consequent reduction of thermal shock resistance. This is believed to be caused by the inversion of crystobalite which occurs at a temperature about 450° F. and is accompanied by a sudden contraction and increase in density. In the past, attempts have been made to avoid devitrification by adding constituents to the high silica glass, such as alumina and magnesia or the like, which decrease the fluidity of the glass. However, the addition of these oxides do not improve spalling on radii. High expansion oxides, such as the sodium, potassium and lithium oxides, improve spalling on radii, but have adverse effects on other properties, such as chemical resistance of the glass.

The present invention is directed to a glass coated article in which the glass has increased resistance to radii spalling and yet also has excellent resistance to thermal spalling, abrasion and chemical attack. According to the invention, the glass coated article is fabricated by adding finely divided crystobalite to a conventional glass frit mill addition. The glass slip is applied to the steel base and the coated steel is fired at an elevated temperature. During firing, a portion of the particles of crystobalite go into solution in the glass, while the major portion of the crystobalite particles remain as finely divided crystalline particles in the glass matrix. On cooling, a semi-crystalline structure results consisting of a matrix of amorphous glass containing particles of crystobalite which are distributed throughout the glass.

The present invention is directed to the opposite concept of that which has prevailed in the glass coating art. The thinking in the past has been to avoid the formation of crystobalite, while in the present invention, crystobalite is purposely added to the glass. While the mechanism of the structure is not entirely clear, it is believed that the particles of crystobalite shrink or contract at a faster rate than the glass matrix, with the result that the crystobalite particles tend to draw or pull the glass matrix with the shrinking particles. This action tends to put the glass in tension which counteracts the compressive stress developed in the glass matrix due to the faster shrinking rate of steel than glass. The resulting composite structure therefore has a lower compressive stress which improves the resistance to radii spalling and yet the undissolved crystobalite particles serve as abutments in the glass matrix to stop the progress of cracks and thereby also improve the resistance to thermal spalling.

The glass coating of the invention can be used for chemical processing vessels and accessories, valves, sheets or panels used to fabricate storage vessels and smokestacks, and the like.

Other objects and advantages will appear in the course of the following description.

The drawings illustrate the best mode presently contemplated of carrying out the invention.

In the drawings:

FIGURE 1 is a graph showing the expansion of crystobalite with temperature; and

FIG. 2 is a graph showing the effect of various forms of silica on the stress in a glass coating on steel.

The base material to be coated with glass is a ferrous metal such as carbon steel or the like. The glass or vitreous enamel to be used in coating the steel base can be any conventional glass normally used to coat steel or other ferrous materials. Examples of various glass frits which can be used in preparing the glass composition of the invention are as follows in weight percent:

| | General composition | Specific formulations | | | |
|---|---|---|---|---|---|
| | | 1 | 2 | 3 | 4 |
| $SiO_2$ | 28–80 | 77 | 61 | 44 | 28.5 |
| $Na_2O$ | 8–18 | 9 | 15 | 11 | 10 |
| $Li_2O$ | 0–5 | 3 | 2 | 2 | 1 |
| $K_2O$ | 0–8 | 1 | 2 | 3 | 5 |
| $B_2O_3$ | 5–15 | 5 | 10 | 12 | 15 |
| $Zr_2O_3$ | 0–6 | 2 | 4 | 3 | 5 |
| $MgO$ | 0–6 | 2 | | 3 | 5 |
| $CaO$ | 0–10 | | 5 | 7 | 8 |
| $CoO$ | 0–1.5 | .7 | .7 | .7 | .1 |
| $MnO_2$ | 0–1.0 | .3 | .3 | .3 | .5 |
| $Al_2O_3$ | 0–15 | | | 8 | 12 |
| $BaO$ | 0–5 | | | 3 | 4 |
| $ZnO$ | 0–7 | | | 3 | 5 |

The glass frit is normally milled with a mill addition and applied as a slip to the steel base by spraying, brushing or dipping. A typical slip has the following composition in parts by weight:

Glass frit _____ 100
Clay _____ 6.0
Bentonite _____ 0.4
$NaNO_2$ _____ 0.7
Water _____ 45

In some cases, however, it may be preferred to apply the glass frit as a dry dust coat to the steel base, in which case the mill addition can be eliminated.

According to the invention, finely divided particles of crystobalite are added to the slip before and/or after milling. Crystobalite is one of a number of different forms of silica, with other more common forms including alpha quartz, fused quartz, and tridymite. The various forms of silica have densities ranging from 1.98 to 4.35 gm./cc. with the density of crystobalite being 2.32 gm./cc. The coefficients of thermal expansion of the various forms of silica also vary widely, ranging from negative values to a positive value of approximately $300 \times 10^{-7}$ in./in./°C., which is the coefficient of thermal expansion of crystobalite. Crystobalite is characterized by a sharp temperature inversion which occurs in the range of 400° F. to 500° F., as can be seen in FIG. 1 of the drawings, when beta crystobalite changes to alpha crystobalite on cooling.

The amount of crystobalite to be added to the glass frit can vary widely depending on the silica content of the frit, the particle size of the crystobalite, the time and temperature of firing and the amount of undissolved crystobalite desired in the final particle. At least a portion of the crystobalite will go into solution in the glass during firing and the silica content of the frit will, in part, determine the amount of the crystobalite which is dissolved. For example, a low silica glass is capable of dissolving a high proportion of crystobalite at a given time and temperature, while a high silica glass will dissolve a substantially smaller proportion of crystobalite at the same time and temperature. Similarly, the coarser the particles of crystobalite, the smaller the amount of crystobalite which will go into solution in a given time and temperature.

Generally speaking, the amount of crystobalite added to the glass frit will be more than 1% by weight of the combined glass frit and crystobalite. In addition, the combination of crystobalite and silica in the glass frit should comprise from about 50% to 85% by weight of the combined glass frit and crystobalite. This means that if a low silica frit is used, such as that shown by formulation 4 above, a relatively large amount of crystobalite is added to bring the combined silica and crystobalite content up to the 50% to 85% range. Conversely, if a high silica frit is used, such as that illustrated by formulation 1 above, a relatively small amount of crystobalite will be added to keep the combined silica and crystobalite content within the 50 to 85 % range.

As previously mentioned, the normal glass coating on steel is under compressive stress, and the addition of crystobalite will tend to counterbalance the compressive stress by putting the glass under tension. However, a glass coating under tension is not desirable, so that amount of crystobalite to be added to the glass frit must be correlated with the silica content of the frit, and the time and temperature of firing to produce a glass coating having a compressive stress of 1500 to 8000 p.s.i. at 100° F. It is also important that these factors be correlated with the particle size of the crystobalite so that the crystobalite is not completely dissolved in the glass matrix during firing and undissolved crytobalite particles remain in the solidified glass coating.

The crystobalite particles should have an average micron size of about 5 to 175 with a range of 20 to 74 being preferred. Particles coarser than 175 microns produce a roughened surface and tend to decrease the chemical resistance. Fine particles below 20 microns in size do not effectively contribute to thermal spall resistance, although the fine particles may improve radii spall resistance, and appreciable amounts of the fine particles may cause the defect called "tearing" in the glass coating.

The crystobalite is uniformly distributed throughout the glass frit by milling or mixing with the mill addition. The glass slip is then applied to the steel base by spraying, dipping or slushing or the like. The glass coated article is then heated to a temperature of about 300° F. for a period sufficient to evaporate the water from the slip. Subsequently, the coated steel article is fired at a temperature generally in the range of 1500 to 1800° F. to fuse the coating to the steel. At this elevated temperature a portion of the crystobalite will be dissolved in the glass, while a second portion of the crystobalite will remain as finely divided particles. On cooling from the elevated temperature, a semi-crystalline structure results which consists of a matrix principally of amorphous glass containing finely divided, undissolved particles of crystobalite which are uniformly distributed throughout the glass matrix. In some cases, devitrified particles of crystobalite may also be present in the glass matrix. The devitirified particles, which crystalized out of solution, have a smaller size than the undissolved crystobalite particles and while the devitrified particles can aid in improving the radii spall resistance, the devitrified particles do not contribute to thermal spall resistance. The undissolved crystobalite particles in the solidified coating will generally comprise about 2 to 20% by weight of the amorphous glass.

FIG. 1 illustrates the thermal expansion of crystobalite with temperature. As beta crystobalite is cooled, it transforms into alpha crystobalite at a temperature of about 450° F. and the transformation is accompanied by an abrupt contraction as shown by the curve in FIG. 1. This extremely abrupt contraction or shrinkage of the crystobalite particles at this transformation temperature tends to pull the glass matrix in the direction of the particle shrinkage with the result that the glass matrix tends to be put under tension. This tendency to impart stress to the glass matrix partially counterbalances the compressive stress which is built up in the glass matrix due to the higher rate of shrinkage or contraction of the steel base on cooling, with the result that the stress in the glass coating containing the undissolved crystobalite particles follows a unique and unexpected pattern during cooling which is illustrated in FIG. 2. FIG. 2 is a graph in which stress in the glass coating is plotted against temperature. The stress in the glass coating is determined by the conventional tangential deflection method which is described in British Patent 984,446. Curve A in FIG. 2 illustrates the stress pattern developed in a glass coating prepared by adding 10 parts by weight of crystobalite particles to 100 parts of a conventional glass frit containing 71% silica. As the temperature is reduced from a value of about 900° F., the stress of the glass containing the crystobalite particles is a straight line function and passes from tension to compression. As the temperature descends, the compressive stress, which has a value of about 5600 p.s.i. at 475° F. abruptly decreases to a value of about 5000 p.s.i. at 375° F. due to the high rate of contraction of the crystobalite as it transforms to the alpha phase. This produces a prominent hump in the curve A. As the temperature continues to decrease, the compressive stress again increases, reaching a value of about 7600 p.s.i. at 100° F.

Curve B illustrates the stress characteristics of a glass identical to that of Curve A, but containing 10 parts of fused quartz particles instead of crystobalite particles. The compressive stress of this glass containing the fused quartz particles is a straight line function throughout the entire cooling range of 900° to 100° F. Curve C in FIG. 2 shows the identical glass containing 10 parts by weight of alpha quartz particles. The stress of this glass containing the alpha quartz particles is a straight line function in cooling from 900° F. to 100° F.

Curve D illustrates the stress characteristics of an identical glass containing 10 parts of dissolved crystobalite, rather than undissolved crystobalite particles, and the stress is a straight line function as the temperature is decreased from 900° F. to 100° F.

The curves in FIG. 2 illustrate that other forms of silica, such as fused quartz, alpha quartz and dissolved crystobalite, do not produce the unique inversion in compressive stress that occurs with the glass of the invention which contains undissolved particles of crystobalite.

The undissolved crystobalite particles serve to provide a lower compressive stress in the glass coating and thereby reduce the tendency of the glass to spall on sharp edges or radii. Moreover, the presence of the undissolved crystobalite particles in the glass matrix serve as abutments which stop the progress of small cracks and thereby also aid in increasing the resistance of the glass to thermal spalling.

Specific examples of the preparation of the glass coated steel articles of the invention are as follows:

EXAMPLE I

A glass frit was prepared having the following composition in parts by weight:

| | |
|---|---|
| $SiO_2$ | 71.5 |
| $ZrO_2+TiO_2$ | 6.1 |
| $B_2O_3$ | 2.5 |
| $LiO_2+K_2O+Na_2O$ | 17.1 |

A glass slip was prepared having the following composition in parts by weight and using the above glass frit:

| | |
|---|---|
| Glass frit | 100 |
| Clay | 6.0 |
| Bentonite | 0.4 |
| $NaNO_2$ | 0.7 |
| Water | 45 |

The glass slip was sprayed on a ¼″ diameter carbon steel rod and a dry dust coat of the fit was then applied over the slip to provide a composite coating 10 mils thick. The coating was dried at a temperature of 350° and then fired at a temperature of 1540° F. for 10 minutes. On cooling from the firing temperature, no spalling of the glass coating was observed. Additional layers of glass were applied to the steel rod in increments of about 8 to 10 mils of thickness. Following the application of each additional coat, the rod was dried and fired as previously recited. It was found that when a total thickness of 40 mils of glass had been applied to the steel rod, the glass coating spalled on cooling from the firing temperature.

A second test was conducted using the same glass frit with the exception that 20 parts of crystobalite were added to the frit. The glass coating was sprayed onto a ¼″ diameter steel rod to a thickness of about 10 mils and the glass rod was then dried and fired by a procedure identical to that previously set forth. No spalling of the glass coating was observed on cooling. Additional coats of glass were built up on the glass rod in increments of about 8 to 10 mils and after each additional coat, the rod was dried and fired as mentioned above. It was found that when the glass coating reached a thickness of 100 mils, spalling occurred on cooling. The addition of 20 parts of crystobalite to the glass frit enabled the thickness of the glass to be built up to approximately 100 mils on the rod before spalling occurred, compared to only a thickness of 40 mils before spalling of a conventional glass. This illustrated the substantial improvement in radii spalling brought about by the invention.

The above-mentioned glass, without the addition of crystobalite had a compressive stress of 7900 p.s.i. when measured by the tangential deflection technique while the same glass, containing 20 parts of crystobalite, had a compression stress of only 3470 p.s.i., thereby illustrating the substantial reduction in compressive stress which results from the addition of crystobalite.

The glass slip composition, without the addition of crystobalite, was applied to a carbon steel plate 3″ x 4″ x ⅜″ as a coating 60 mils thick. After drying and firing at temperatures indicated above to fuse the glass to the steel, the glass coated plate was subsequently heated to a series of elevated temperatures and rapidly quenched by water at a temperature of 70° F. It was noted that the glass coating spalled when the plate was quenched from a temperature of 390° F. A similar plate was coated with the same glass, but containing 20 parts of crystobalite. This plate was tested in a similar manner and it was noted that no spalling of the glass coating occurred on quenching from temperatures up to 660° F. This test illustrated the improvement in thermal spalling resulting from the addition of crystobalite.

EXAMPLE II

A glass frit was prepared having the folowing composition:

| | Parts |
|---|---|
| $SiO_2+TiO_2+ZrO_2$ | 72 |
| $B_2O_3$ | 5 |
| $LiO_2+Na_2O+F_2$ | 22.5 |
| Color | 0.5 |

A carbon steel strip 1″ x 6″ x .069″ was heated to a temperature of about 1520° F. The strip was then removed from the furnace and the glass frit was dusted onto the hot strip and returned to the furnace for an additional 3 minutes at the firing temperature. Subsequently, the glass coated plate was cooled to room temperature and the compressive stress of the glass coating was measured by the conventional tangential deflection technique and found to be 4700 p.s.i. at 100° F.

A second test was conducted using the same glass frit but containing 10 parts of crystobalite. The glass frit was dusted on the carbon steel strip in the manner outlined above. After firing, the glass coating was found to have a compressive stress at 3110 p.s.i. at 100° F. A third sample was prepared by adding 15 parts of crystobalite to the above glass frit. The resulting glass coating after firing had a compressive stress of only 2390 p.s.i. at 100° F.

The glass coating of the invention, produced by the addition of crystobalite particles, has excellent resistance to radii spalling, thermal spalling, abrasion and chemical attack and the improvement in physical properties is achieved without the need for costly heat treatment. By the proper addition of crystobalite to any conventional glass, it is possible to control the resultant compressive stress of the glass coating to obtain the optimum stress for different base metal compositions as well as different base metal thicknesses and contours.

I claim:
1. A glass coated article, comprising a ferrous base, and a glass coating bonded to said ferrous base and comprising an amorphous glass matrix containing a plurality of undissolved, non-crystallized in situ particles of crystobalite, said particles having a size in the range of 5 to 175 microns and being present in an amount of at least 1% by weight of the combined weight of the glass matrix and the particles, said glass coating having improved resistance to radii spalling and thermal spalling, the compressive stress of the glass coating on cooling exhibiting an inversion from a straight line function at a temperature in the range of 400° to 500° F.

2. The article of claim 1 in which the compressive stress of the glass coating at a temperature of 100° F. is in the range of 1500 to 8000 p.s.i.

3. The article of claim 1, wherein said glass matrix contains at least 61% by weight of silica.

4. A method of fabricating a glass coated article, comprising adding finely divided particles of crystobalite to a glass frit to form a mixture, applying the mixture to a ferrous base, firing the base at an elevated temperature sufficiently high to fuse the glass and for a time insufficient to completely dissolve all of the particles of crystobalite, and thereafter cooling the coated base to room temperature to provide a glass coating comprising an amorphous glass matrix containing undissolved particles of crystobalite distributed therein.

5. The method of claim 4, in which the glass frit contains a substantial proportion of silica and the crystobalite is added in an amount of at least 1% by weight of the combined weight of the glass frit and crystobalite.

6. The method of claim 4 in which the fused glass coating at a temperature of 100° F. has a compressive stress in the range of 1500 to 8000 p.s.i.

7. The method of claim 5, in which the crystobalite has an average micron size of 20 to 74.

8. The method of claim 5, in which the combined weight of the silica and crystobalite is from 50 to 85% by weight of the combined weight of the glass frit and the crystobalite.

9. The method of claim 5 in which the crystobalite has an average particle size in the range of 5 to 175 microns.

References Cited

UNITED STATES PATENTS

| | | | |
|---|---|---|---|
| 2,851,376 | 9/1958 | Adlassing | 117—129 XR |
| 3,025,188 | 3/1962 | Larsh et al. | 117—129 XR |
| 3,051,589 | 8/1962 | Sanford et al. | 106—48 XR |
| 3,110,619 | 11/1963 | Koenig et al. | 106—49 XR |
| 3,285,773 | 11/1966 | Dunning | 117—129 |
| 3,368,712 | 2/1968 | Sanford et al. | 106—48 XR |

OTHER REFERENCES

Searle, A. B.—Refractory Materials, 1950, Charles Griffin & Co., Ltd., London, TN677.S4. 1950. Only pp. 163 and 164 made of record.

DAVID KLEIN, Primary Examiner

U.S. Cl. X.R.

106—48, 49

UNITED STATES PATENT OFFICE
CERTIFICATE OF CORRECTION

Patent No. 3,507,687              Dated April 21, 1970.

Inventor(s)    James A. Laird

It is certified that error appears in the above-identified patent and that said Letters Patent are hereby corrected as shown below:

Column 3, line 23, Cancel "particle" and substitute therefor ---article---, Column 5, line 36, Cancel "fit" and substitute therefor ---frit---, Column 6, line 16, Cancel "folowing" and substitute therefor ---following---, Column 6, line 21, Cancel "$LiO_2$" and substitute therefor ---$Li_2O$---

SIGNED AND SEALED
OCT 6 - 1970

OCT. 6, 1970

(SEAL)
Attest:

Edward M. Fletcher, Jr.
Attesting Officer

WILLIAM E. SCHUYLER, JR.
Commissioner of Patents